US005189444A

United States Patent [19]

Yamada et al.

[11] Patent Number: 5,189,444

[45] Date of Patent: Feb. 23, 1993

[54] AUTOMATIC ROLL-IN TAKE-UP REEL AND MULTI-COLOR IMAGE RECORDING APPARATUS USING THE SAME

[75] Inventors: Masao Yamada, Yokohama; Yoshihiro Ikeda; Hiraku Yamamoto, both of Chigasaki, all of Japan

[73] Assignee: Matsushita Graphic Communication Systems, Inc., Tokyo, Japan

[21] Appl. No.: 757,410

[22] Filed: Sep. 10, 1991

[30] Foreign Application Priority Data

Sep. 10, 1990 [JP] Japan .................................. 2-240914
Mar. 20, 1991 [JP] Japan .................................. 3-056609

[51] Int. Cl.[5] ...................... G01D 15/06; G03G 15/01
[52] U.S. Cl. ...................................... 346/157; 355/326
[58] Field of Search ................. 346/157; 355/326–328

[56] References Cited

U.S. PATENT DOCUMENTS 4,728,987 3/1988 Diola et al. ......................... 355/326
4,733,270 3/1988 Nishikawa et al. ................. 355/326

FOREIGN PATENT DOCUMENTS 62-269851 11/1987 Japan .

*Primary Examiner*—George H. Miller, Jr.
*Attorney, Agent, or Firm*—Lowe, Price, LeBlanc & Becker

[57] ABSTRACT

An improved automatic roll-in take-up roller for winding and unwinding a continuous sheet-like recording medium is disclosed, which comprises a plurality of cams disposed inside a hollow cylindrical body of the take-up roller for releasably holding a leading end of the recording medium inside the take-up roller, and a switching guide unit disposed immediately upstream of take-up roller for guiding the recording medium toward the take-up roller or a cutter. After the leading end of the recording medium is retained on the take-up roller, the guide unit can be displaced to a position spaced far distant from an outer peripheral surface of the take-up roller so that a large number of turns of the recording medium can be wound around the take-up roller. The cams are arranged along a longitudinal axis of the take-up roller at such a distribution that the recording medium is automatically aligned even when the leading end of the recording paper is inserted into the take-up roller in an obliquely displaced condition. An automatic multi-color image recording apparatus incorporating such a take-up roller is also disclosed.

15 Claims, 8 Drawing Sheets

FIG. 11
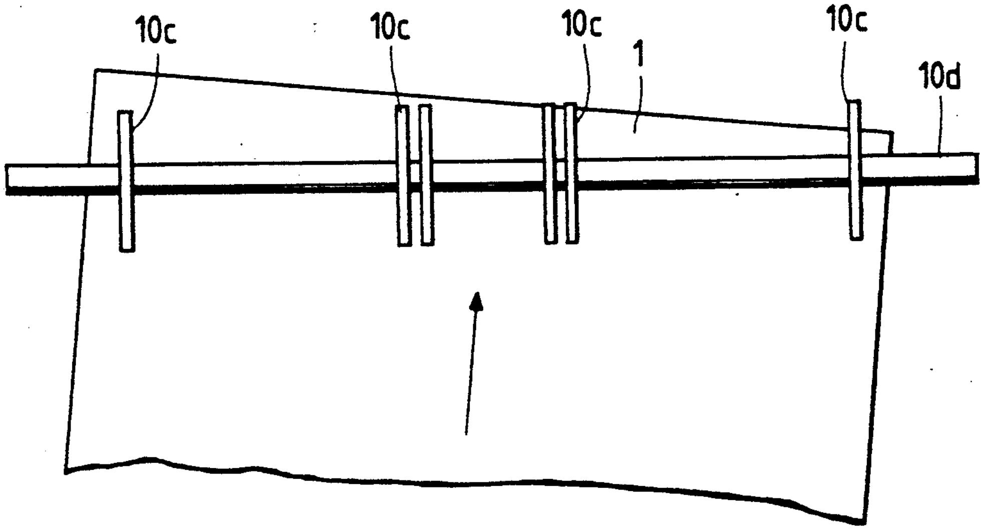
FIG. 12
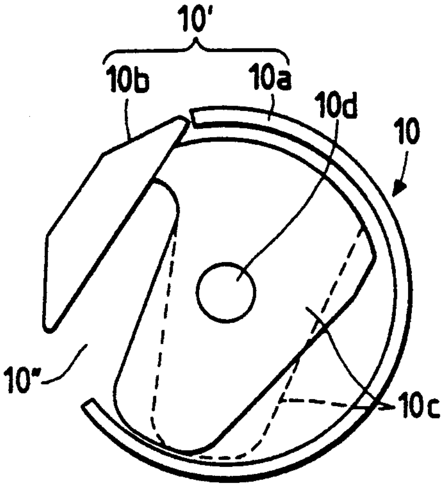
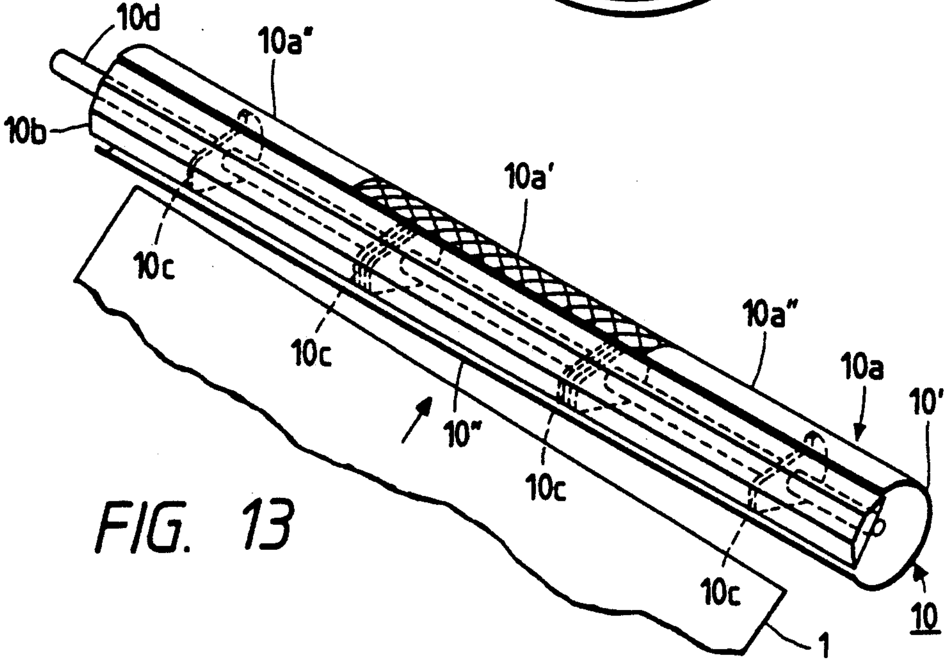
FIG. 13

AUTOMATIC ROLL-IN TAKE-UP REEL AND MULTI-COLOR IMAGE RECORDING APPARATUS USING THE SAME

BACKGROUND OF THE INVENTION

1. Field of the Invention

The present invention relates to a take-up roller for winding up a continuous sheet-like recording medium while gripping a leading end of the recording medium, and also to a multi-color image recording apparatus using such take-up roller.

2. Description of the Prior Art

In general, when a multi-color image is to be recorded on a recording medium, a latent image formation process and a development process using a liquid developer for each of a plurality of different colors are repeated. In this instance, the recording medium must be moved through an identical image recording station a plurality of times equal in number to the number of colors used in the formation of the multi-color image (i.e., four times when four colors are used). When a rolled continuous sheet of recording paper (hereinafter referred to as "recording paper") is used as a recording medium, a leading end of the recording paper is wound on the take-up roller to securely connect the recording paper with the take-up roller and, thereafter, a succeeding portion of the recording paper is alternately wound on and unwound from the take-up roller each time when an image in one color is recorded on the identical portion of the recording paper. When image recording is completed, the recorded portion of the recording paper is cut off by a knife, for example. The winding of the leading end of the recording paper onto the take-up roller is conventionally performed by a manual operation.

With this manual winding operation, an automatic color image recording process cannot be performed by the conventional color image recording apparatus. Taking this difficulty in account, an attempt has been proposed to automatically wind up the leading end of a continuous recording paper, as disclosed in U.S. Pat. No. 4,733,270. According to the disclosed attempt, a guide plate in the form of a split tube is disposed around a take-up roller for guiding the leading end of the recording paper between a peripheral surface of the take-up roller and an arcuate roll-in guide plate which is disposed adjacent to the peripheral surface of the take-up roller for gripping therebetween the leading end of the recording paper. However, there is no teaching in said U.S. patent as to how the roll-in guide plate operates in gripping the leading end of the recording paper. In addition, the disclosed arrangement of the guide plates cannot rectify or correct the direction of advancement of the recording paper when, due to some reasons, the leading end of the recording paper enters obliquely between the take-up roller and the roll-in guide plate. A subsequent winding operation of the take-up roller necessarily involves the formation of folds or wrinkles on the recording paper.

SUMMARY OF THE INVENTION

With the foregoing drawbacks of the prior art in view, it is an object of the present invention to provide a automatic roll-in take-up roller which is capable of gripping a leading end of a continuous recording medium when the recording medium is wound around the take-up roller, which is capable of releasing leading end when the recording medium is unrolled from the take-up roller, and which is also able to align the recording medium when the leading end of the recording medium is supplied to the take-up roller in an obliquely displaced condition.

Another object of the present invention is to provide a multi-color image recording apparatus incorporating such a take-up roller.

According to a first aspect of the invention, there is provided a take-up roller for winding up a continuous recording medium, which comprises a hollow cylindrical body having a longitudinal slit for receiving therein a leading end of the recording medium, the hollow cylindrical body including a first peripheral wall portion extending from a side edge of the slit over a predetermined angular range of the full circumference the hollow cylindrical body and a second peripheral wall portion extending over the remaining angular range of the full circumference of the hollow cylindrical body. The first peripheral wall portion has an inside diameter larger than the inside diameter of the second peripheral wall portion. The take-up roller further comprises a plurality of concentric cams disposed for oscillation within the hollow cylindrical body about a longitudinal axis of the hollow cylindrical body. Each of the cams includes a first arm having a length greater than a half of the diameter of the second peripheral wall portion and smaller than a half of the diameter of the first peripheral wall portion, and a second arm integral with the first arm and engageable with an inside surface of the second peripheral wall portion. The first arm is, therefore, engageable with the inside surface of the second peripheral wall portion with the leading end of the recording medium disposed therebetween to grip the leading end within the hollow cylindrical body. The second arm is disposed at such a position relative to the first arm that the first arm is held out of register with the slit and thereby opens the slit when the second arm is in engagement the second peripheral wall portion. A first rotating drive unit drivable to oscillate the cams is capable of slipping relative to the cam when a torque on the cams exceeds a first predetermined value. A second rotating drive unit drivable to rotate the hollow cylindrical body is capable of slipping relative to the hollow cylindrical body when a torque on the hollow cylindrical body exceeds a second predetermined value, the second predetermined torque value being greater than the first predetermined torque value.

The cams may be composed of at least one first cam disposed substantially at a central portion of the hollow cylindrical body, and a pair of second cams disposed adjacent to opposite ends of the hollow cylindrical body, respectively. The first arm of the first cam is capable of producing a first frictional force when it is brought into engagement with the inside surface of the second peripheral wall portion, while the first arms of the pair of second cams are capable of producing a second frictional force when they are brought into engagement with the inside surface of the second peripheral wall portion. The first frictional force is greater than the second frictional force.

As an alternative, the first arm of the first cam may be frictionally engageable with the inside surface of the second peripheral wall portion prior to engagement between the first arms of the pair of second cams and the inside surface of the second peripheral wall portion. The first arm of the first cam is in advance of the first arms of the pair of second cams in phase in a direction same as the direction of rotation of the take-up roller effected when the take-up roller is winding up the recording medium.

According to a preferred embodiment, the hollow cylindrical body has an outer peripheral surface composed of a first portion extending around a central portion of the hollow cylindrical body and a second portion extending around opposite end portions of the hollow cylindrical body. The first outer peripheral surface portion has a coefficient of friction greater than the coefficient of friction of the second outer peripheral surface portion. The first outer peripheral surface portion preferably has a length ranging from one third to two thirds of the entire length of the hollow cylindrical body.

The hollow cylindrical body may further include an anti-flip member attached to the inside surface of the second peripheral wall portion at a position with which the first arm of each of the cams is engageable.

According to a second aspect of the present invention, there is provided a multi-color image recording apparatus for forming images in a plurality of colors in a superposed manner on a recording medium, which comprises: recording medium conveying means for reciprocating a plurality of times the recording medium along a feed path; latent image forming means disposed on the feed path for forming on the recording medium latent images corresponding to the images in the plurality of colors; a plurality of developing means each supplied with a developer for a different color for changing each respective latent image into a visible image; cutting means for cutting off a predetermined length from the recording medium; a take-up roller rotatable in forward and reverse directions for winding up and rewinding the recording medium; and guide means for guiding the recording medium selectively toward the cutting means and the take-up roller. The take-up roller includes means for automatically holding a leading end of the recording medium when the recording medium is guided by the guide means into the take-up roller and for retaining the leading end of the recording medium while the recording medium is wound around the take-up roller. Preferably, the holding and retaining means comprises at least one cam movably disposed within the take-up roller and capable of oscillating between a first position in which a portion of the cam forces the leading end of the recording medium against an inside surface of the take-up roller, and a second position in which the portion of the cam is separated from the inside surface of the take-up roller. The cam is rotatable about an axis of rotation of the take-up roller together with the take-up roller while the cam is being disposed in the first position.

According to a preferred embodiment, the take-up roller has a longitudinal slit for receiving a leading end of the recording medium and includes means for holding the leading end of the recording medium within the take-up roller and substantially at the same time for closing the longitudinal slit. The holding and closing means comprises at least one cam movably disposed within the take-up roller and capable of oscillating between a first position in which a portion of the cam forces the leading end of the recording medium against an inside surface of the take-up roller and substantially closes the slit, and a second position in which said portion of the cam is separated from the inside surface of the take-up roller. The cam includes a first arm constituting said portion of the cam, and a second arm integral with the first arm and disposed at such a position relative to the first arm that, when the cam is disposed in the second position, the second arm engages the inside surface of the take-up roller to keep the first arm out of registry with the slit of the take-up roller.

The cam means may comprise at least one first cam disposed substantially at a central portion of the take-up roller, and a pair of second cams disposed adjacent to opposite ends of the take-up roller, respectively. The first cam is engageable with the inside surface of the take-up roller to produce therebetween a first frictional force, while the second cams is frictionally engageable with the inside surface of the take-up roller to produce therebetween a second frictional force, the first frictional force being greater than the second frictional force.

According to a preferred embodiment, the first cam being frictionally engageable with the inside wall of the take-up roller before the second cams engage the inside surface of the take-up roller. The first cam and the second cams are firmly mounted on a cam shaft at different setting angles.

The guide means preferably is movable from a first position to a second position to shift the direction of guidance of the recording medium when a predetermined amount of recording medium is wound on the take-up roller. The guide means is located adjacent to an outer peripheral surface of the take-up roller when it is disposed in the first position, and is spaced far distant from the outer peripheral surface of the take-up roller when it is disposed in the second position. The guide means preferably comprises first and second pivotally movable guide members. The first guide member has a first guide surface on which the recording medium is guided. a first pivot axis at an end of the first guide surface, and a first engagement surface at an opposite end of the first guide surface. The second guide member has a second guide surface on which the recording medium is guided, a second pivot axis disposed below the second guide surface, and a second engagement surface frictionally engageable with the first engagement surface within a predetermined angular range for causing the second guide member to turn about the second pivot axis in response to pivotal movement of the first guide member.

The above and other objects, features and advantages of the present invention will become more apparent from the following description when making reference to the detailed description and the accompanying sheets of drawings in which preferred structural embodiments incorporating the principles of the present invention are shown by way of illustrative examples.

BRIEF DESCRIPTION OF THE DRAWINGS

FIG. 11 is a diagrammatical plan view showing a condition in which a leading end of a continuous recording medium moves obliquely into the take-up roller;

FIG. 12 is a side view showing a take-up roller according to another embodiment of this invention;

FIG. 13 is a perspective view showing a take-up roller according to still another embodiment of this invention.

DETAILED DESCRIPTION OF THE PREFERRED EMBODIMENTS

Figure 1:
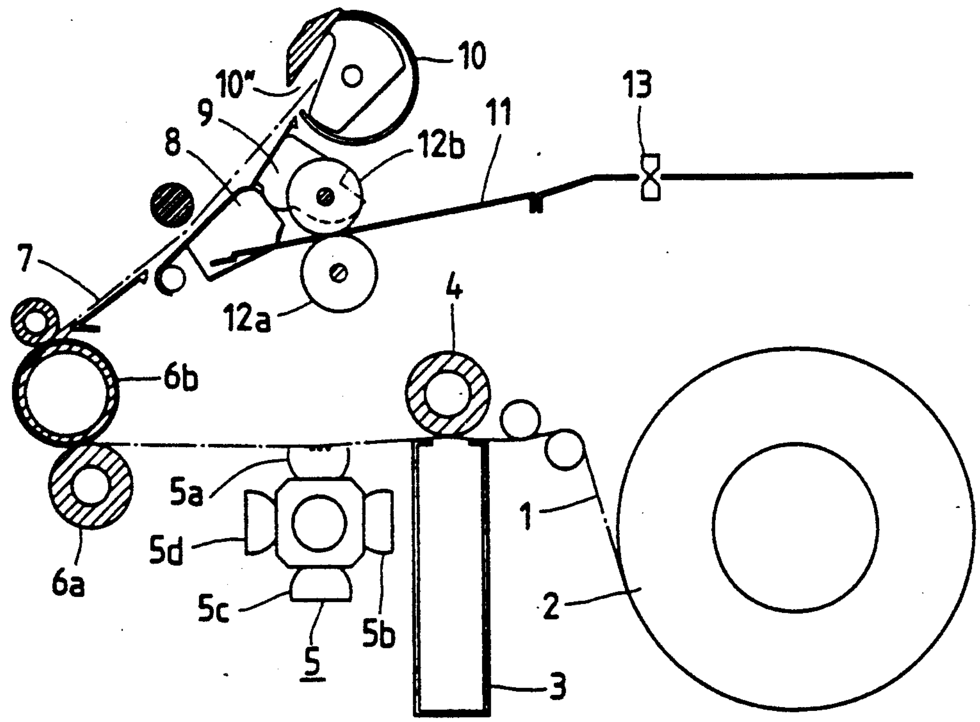
FIG. 1 is a diagrammatical side view, partly in cross section, of the arrangement of a multi-color image recording apparatus according to the present invention.

Referring now to the drawings, wherein like reference characters designate like or corresponding parts throughout the several views, FIG. 1 diagrammatically shows the arrangement of a multi-color recording apparatus embodying the present invention for recording images in a plurality of colors, in a superposed manner, on a continuous recording medium 1 which is composed of a rolled continuous sheet of electrostatic recording paper (hereinafter referred to as "electrostatic recording paper").

The multi-color recording apparatus generally comprises a supply roller 2 for supplying and taking up the electrostatic recording paper 1, an electrostatic recording head 3 for forming a latent image on the electrostatic recording paper 1, a pressure roller 4 for forcing the electrostatic recording paper 1 against the electrostatic recording head 3, and a rotatable multi-color developing unit 5 driven by a motor (not shown). The multi-color developing unit 5 has a plurality (four in the illustrated embodiment) of developing heads 5*a*, 5*b*, 5*c* and 5*d* spaced at equal angular intervals and supplied with developers for different colors (black, cyan, magenta and yellow) so as to develop the latent images on the electrostatic recording paper 1. The apparatus further includes a cooperating pair of recording paper convey roller 6*a*, 6*b* disposed upstream of the developing unit 5 for reciprocating the electrostatic recording paper 1 longitudinally along a feed path on which the electrostatic recording head 3 and the developing unit 5 are disposed. The electrostatic recording paper 1 fed forwardly by the recording paper convey rollers 6*a*, 6*b* is guide by a guide plate 7 toward a switching guide unit composed of a first guide member 8 and a second guide member 9 disposed downstream of the first guide member 8.

The first guide member 8 is pivotally movable between a first position aligned with the take-up roller 10 for guiding the electrostatic recording paper 1 toward a take-up roller 10, and a second position aligned with a cutter 13 for guiding the electrostatic recording paper 1 toward the cutter 13. The second guide member 9 is pivotally movable between a first position located close to the take-up roller 10 in which the second guide member 9 cooperates with the first guide member 8 in guiding the electrostatic recording paper 1 toward the take-up roller 10, and a second position spaced far distant from the take-up roller 10 in which the second guide member 9 permits the take-up roller 10 to wind up a large number of turns of the electrostatic recording paper 1. When the guidance of the electrostatic recording paper 1 relative to the take-up roller 10 has completed, the first guide member 8 is moved from the first position to the second position in response to which the second guide member 9 moves from the first position to the second position. The take-up roller 10 is constructed to automatically roll in and firmly grip a leading end of the electrostatic recording paper 1 as the winding operation proceeds and also to release the leading end of the electrostatic recording paper 1 when the electrostatic recording paper 1 is unrolled from the take-up roller 10. The electrostatic recording paper 1, as it is guided by the first guide member 8 toward the cutter 13, is placed on a guide plate 11 and then advanced along the guide plate 11 toward the cutter 13 by means of a cooperating pair of feed rollers 12*a*, 12*b* associated with the guide plate 11. The cutter 13 is operative to cut a recorded portion of the electrostatic recording paper 1 according to the size of the recorded image.

The first and second guide members 8, 9 and the take-up roller 10 will be described in greater detail with reference to FIG. 2. The first guide member 8 includes a first guide surface 8*a* on which the electrostatic recording paper 1 is guided, a first pivot axis 8*b* about which the first guide member 8 is pivotally movable, and a first engagement surface 8*c* at the distal end of the first guide member 8. The pivot axis 8*b* is disposed at an upstream side of the first guide surface 8*a* and, hence, the first engagement surface 8*c* is disposed on a downstream side of the first guide surface 8*a*. The second guide member 9 includes a second guide surface 9*a* on which the electrostatic recording paper 1 is guide, a second pivot axis 9*b* about which the second guide member 9 is pivotally movable, and a second engagement surface 9*c* frictionally engageable with the first engagement surface 8*c* to turn the second guide member 9 about the second pivot axis 9*b* in the counterclockwise direction in FIG. 2 in response to pivotal movement of the first guide member 8 in the clockwise direction of the same figure. To this end, the second engagement surface 9*b* is disposed on an upstream side of the second guide surface 9*a*, while the second pivot axis 9*b* is disposed on the downstream side of the second guide surface 9*a* and located below the second guide surface 9*a*.

The take-up roller 10 includes a hollow cylindrical body 10′ having a longitudinal slit 10″ and composed of a first peripheral wall portion 10*a* and a second peripheral wall portion 10*b*. The first peripheral wall portion 10*a* extends arcuately from one end (one side edge) of the slit 10″ over a major part of the full circumference of the hollow cylindrical body 10′ and terminates far ahead of an opposite end (an opposite side edge) of the slit 10″. The second peripheral wall portion 10*b* extends contiguously from one side of the first peripheral wall portion 10*a* over the remaining angular range of the full circumference of the hollow cylindrical body 10′ and terminates at the opposite end (opposite side edge) of the slit 10″. The first peripheral wall portion 10*a* is constituted by a split circular tube, while the second peripheral wall portion 10*b* is constituted by a segmental elongate plate having a chord-like flat inside surface 10*b*′. With this construction, the second peripheral wall portion 10*b* has an inside diameter smaller than the inside diameter of the first peripheral wall portion 10*a*. In other words, the hollow cylindrical body 10′ has a minimum inside diameter measured at the second peripheral wall portion 10*b* and a maximum inside diameter measured at the first peripheral wall portion 10*a*. A cam means composed of a plurality of concentric cams 10*c* is disposed for oscillation within the hollow cylindrical body 10′ in concentric relation to the hollow cylindrical body 10′. Each of the cams 10*c* includes a first arm 10c' and a second arm 10c'' integral with the first arm 10c'. The first arm 10c' has a length which is smaller than a half of the inside diameter of the first peripheral wall portion 10a and is greater than a half of the inside diameter of the second peripheral wall portion 10b. The first arm 10c' is, therefore, engageable with the flat inside surface 10b' of the second peripheral wall portion 10b for a purpose described below. The front end of the first arm 10c' has a width greater than the width of the slit 10'' for a purpose described below. The second arm 10c'' is also engageable with the inside surface 10b' of the second peripheral wall portion 10b. The second arm 10c'' is disposed at such a position relative to the first arm 10b' that, when the second arm 10c'' engages the inside surface 10b', the first arm 10c' is held out of registry with the slit 10'' and thereby opens the slit 10''. An anti-slip member 10e made of rubber or the like material having a large coefficient of friction is attached by bonding to a portion of the inside surface 10b' with which the first arm 10c' is engageable.

The hollow cylindrical body 10' of the take-up roller 10 which is composed of the first and second peripheral wall portions 10a, 10b is rotated in forward and reverse directions by a first rotating drive unit M1 (FIG. 3) for winding up and unrolling the electrostatic recording paper 1. The cams 10c are fixedly mounted on a cam shaft 10d disposed concentrically in the hollow cylindrical body 10'. The cam shaft 10d is turned clockwise and counter-clockwise about its own axis by a second drive unit M2 (FIG. 3) so as to oscillate the cams 10c. The first rotating drive unit M1 is composed of an electric motor (hereinafter referred to as "winding motor") drivable in forward and reverse directions and having an output shaft coupled to an axis of rotation of the take-up roller 10 via a slip clutch. The slip clutch is designed to slip and thereby disengage the take-up roller 10 from the winding motor when a load on the winding motor (corresponding to a torque to be produced by the winding motor to rotate the take-up roller 10) exceeds a first predetermined value. Similarly, the second rotating drive unit M2 is composed of an electric motor (hereinafter referred to as "cam motor") drivable in forward and reverse directions and having an output shaft coupled to the cam shaft 10d via a slip clutch. The slip clutch is designed to slip and thereby disengage the cam shaft 10d from the cam motor when a load on the cam motor (corresponding to a torque to be produced by the cam motor to oscillate the cam shaft 10d and the cams 10c) exceeds a second predetermined value, the second predetermined torque value being smaller than the first predetermined torque value for a reason described below. The cam motor is rotatable at a higher speed than the winding motor. In short, the first drive unit M1 (i.e. the winding motor) is drivable to rotate the take-up roller 10 in forward and reverse directions and capable of slipping relative to the take-up roller 10 when a torque exerted on the take-up roller 10 exceeds a first predetermined value, while the second drive unit M2 (i.e. the cam motor) is drivable to turn the cam shaft 10d about its own axis in forward and reverse directions and is capable of slipping relative to the cams 10c when a torque exerted on the cams 10c exceeds to a second predetermined value which is smaller than the first predetermined torque value.

Figure 3:
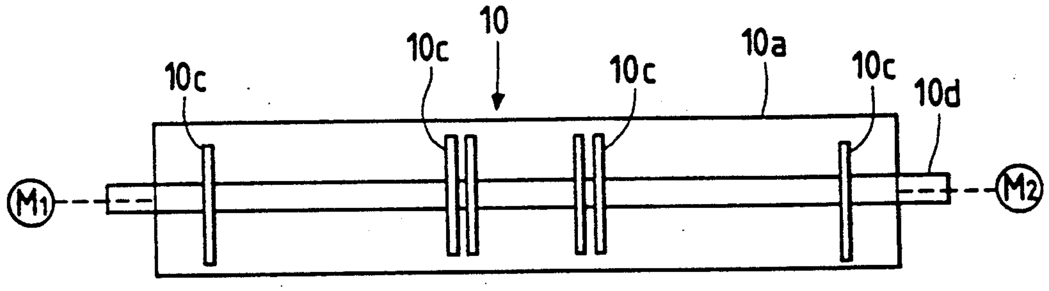
FIG. 3 is a diagrammatical plan view showing the arrangement of cams disposed within the take-up roller.

As shown in FIG. 3, the number of the cams 10c in the illustrated embodiment is six and four of them are disposed at a central portion of the take-up roller 10, two remaining cams being disposed adjacent to opposite ends of the take-up roller 10. In addition, the centrally disposed four cams 10c are divided into two groups disposed symmetrically about a longitudinal center of the take-up roller 10, each cam group being composed of a pair of juxtaposed cams 10c.

The multi-color recording apparatus of the foregoing construction operates as follows.

The dielectric recording paper 1 is unrolled from the supply roller 2 and guided in the forward direction (the left-hand direction in FIG. 1) to the recording paper convey rollers 6a, 6b through an image recording station which is constituted by the dielectric recording head 3 and the multi-color developing unit 5. During that time, a latent image in a first selected color (black, for example) is formed on the dielectric recording paper 1 by means of the dielectric recording head 3; the latent image on the dielectric recording paper 1 is subsequently developed by a liquid developer for black supplied from a first developing head 5a of the developing unit 5. As a result of the development process, a visible image colored in black emerges on the dielectric recording paper 1. Recording of the image in the first color is thus performed. As the recording proceeds, a leading end of the dielectric recording paper 1 is advanced by the recording paper convey rollers 6a, 6b toward the guide unit 8, 9 while being guided by the guide plate 7. The leading end is further guided by the first and second guide members 8, 9 of the switch guide unit, then moves into the take-up roller 10 through the slit 10'', and finally is retained firmly on the take-up roller 10. The take-up roller 10 is then rotated in a forward direction (clockwise direction in FIG. 1) to wind up the dielectric recording paper 1.

Prior to the start of recording of an image in a second color (cyan, for example), the dielectric recording paper 1 is unrolled from the take-up roller 10 until a portion on which the image in the first color has been recorded must be returned to the initial position located immediately upstream of the image recording station. To this end, direction of rotation of the take-up roller 10, the recording paper convey rollers 6a, 6b and the supply roller 2 is reversed. Then, the supply roller 2 and the recording paper convey rollers 6a, 6b are rotated again in the forward direction to advance the dielectric recording paper 1 leftward in FIG. 1 across the recording station. During that time, a latent image in the second color (cyan) is formed by the dielectric recording head 3 on the dielectric recording paper 1 in superposed relation to the first image. The latent image on the dielectric recording paper 1 is then developed by a second developing head 5b using a liquid developer for the second color (cyan), whereby the latent image is made visible. Thus, a second image colored in cyan and superposed in the first image of black emerges on the dielectric recording paper 1. Thereafter, recording of an image in a third color (magenta, for example) and succeeding recording of an image in a fourth or final color (yellow) are performed by repeating the same process as described above. In this instance, the take-up roller 10 repeat winding and unrolling operations with respect to the dielectric recording paper 1. When image recording in the final color is performed, the leading end of a portion of the die-electric recording paper 1 on which a multi-color superposed image is recorded is guided by the first guide member 8 onto the guide plate 11 and then fed by the feed rollers 12a, 12b toward the cutter 13 which in turn operates to cut the recorded portion of the dielectric recording paper 1 into a predetermined size.

The operation of the first and second guide members 8, 9 and the take-up roller 10 will be described in greater detail with reference to FIGS. 4 through 9. These figures illustrate the manner in which a leading end of the dielectric recording paper 1 is guided by the first and second guide members 8, 9 into the take-up rollers 10 and retained on the take-up roller 10, and the dielectric recording paper 1 is then wound on the take-up roller 10 by one turn while the leading end is being retained on the take-up roller 10.

Figure 4:
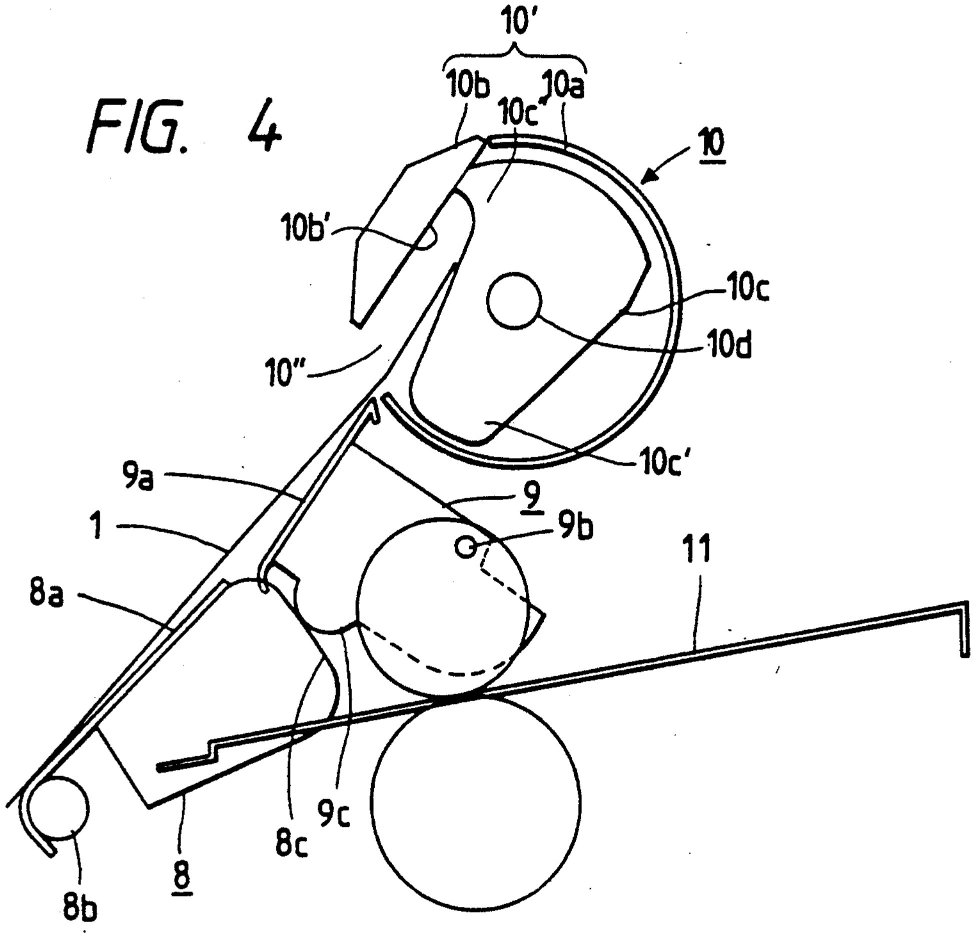
FIGS. 4 through 9 are enlarged side views illustrative of the manner in which the switching guide unit and the take-up roller operate.

As shown in FIG. 4, the leading end of the dielectric recording paper 1 is fed through a slit 10'' into the take-up roller 10 while being guided on the first and second surfaces 8*a*, 9*a* of the first and second guide members 8, 9. The first and second guide surfaces 8*a*, 9*a* substantially lie in a same plane and a downstream end of the second guide surface 8*a* lies in a same level as a lower edge of the slit 10'' of the take-up roller 10. The take-up roller 10 shown in FIG. 4 is disposed in its original position. In this instance, the slit 10'' is kept open as the second arm 10*c''* of each cam 10*c* engages the inside surface 10*b'* of the take-up roller 10 to keep the first arm 10*c'* out of registry with the slit 10''. The leading end of the dielectric recording paper 1 received in a pocket defined between the take-up roller 10 and the cams 10*c* disposed inside the take-up roller 10.

Figure 5:
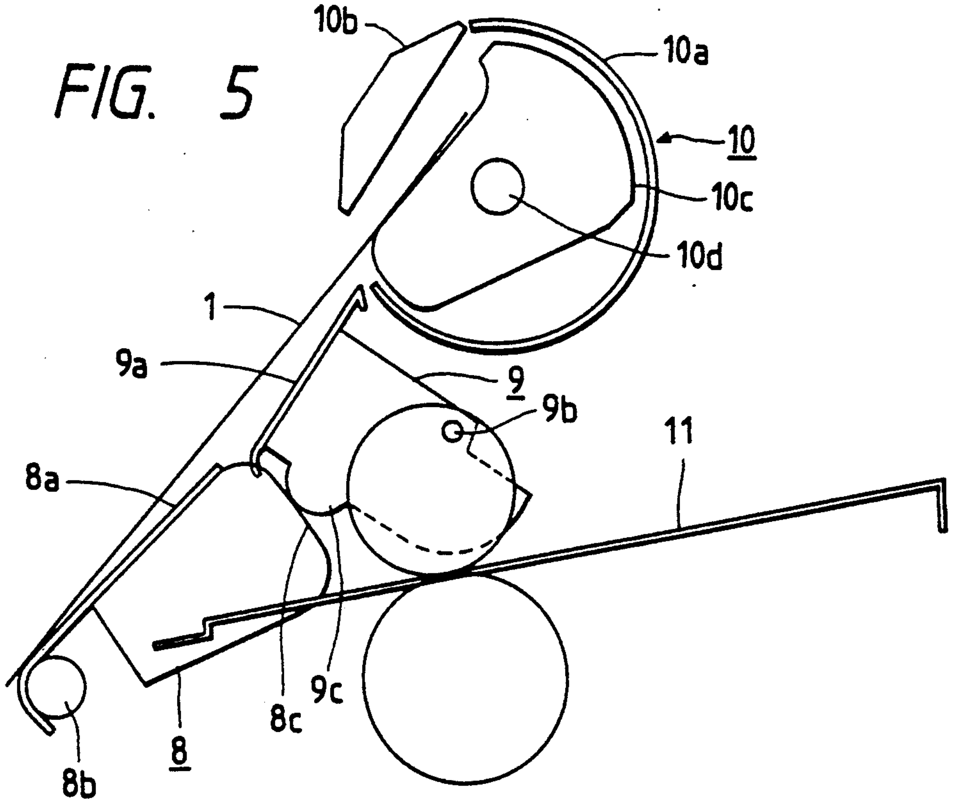

Then the cam shaft 10*d* is driven by the second rotating drive unit M2 (FIG. 3) to turn the cams 10*c* in the clockwise direction, as shown in FIG. 5.

Figure 6:
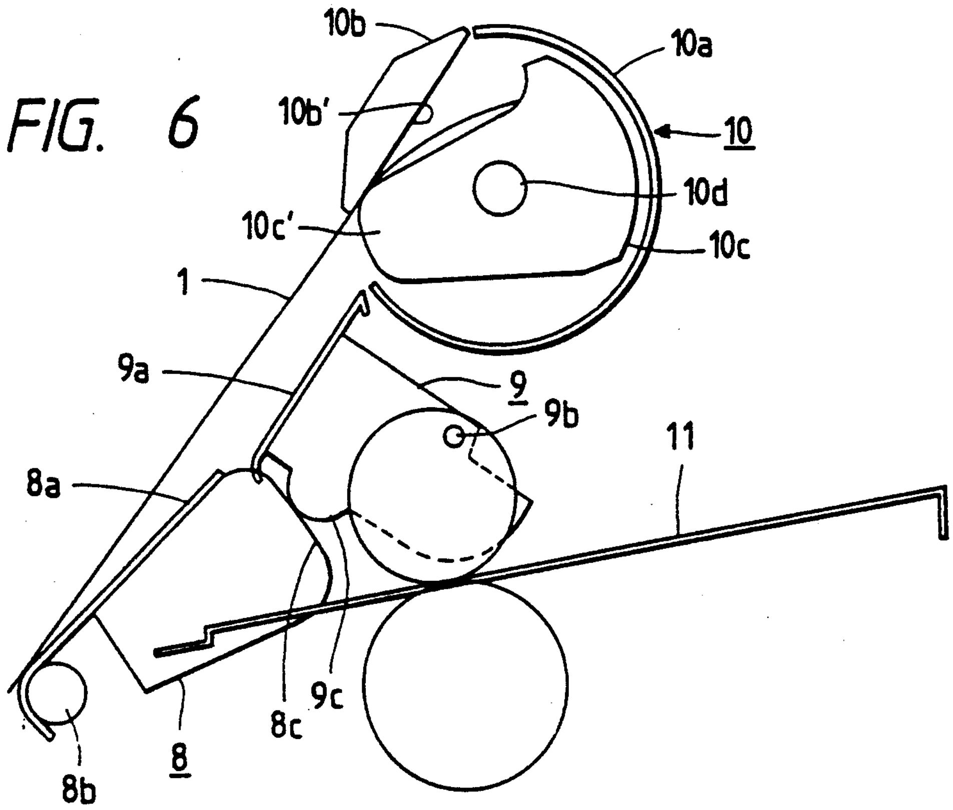

A continuous clockwise movement of the cams 10*c* causes the respective first arms 10*c'* to force the leading end of the dielectric recording paper 1 against the inside surface 10*b'* of the take-up roller 10, thereby gripping the leading end between the cams 10*c* and the take-up roller 10, as shown in FIG. 6. In this instance, the slit 10'' is substantially closed by the first arms 10*c'* of the respective cams 10*c*. The leading end of the dielectric recording paper 1 thus gripped is firmly retained on the take-up roller 10 against slip. An enhanced recording paper gripping force can be obtained when, as shown in FIG. 2, the take-up roller 10 is provided with an anti-slip member 10*e*, such as a rubber sheet, bonded to a portion of the inside surface 10*b'* against which the leading end of the dielectric recording paper 1 is forced by the first arms 10*c'* of the cams 10*c*.

Figure 8:
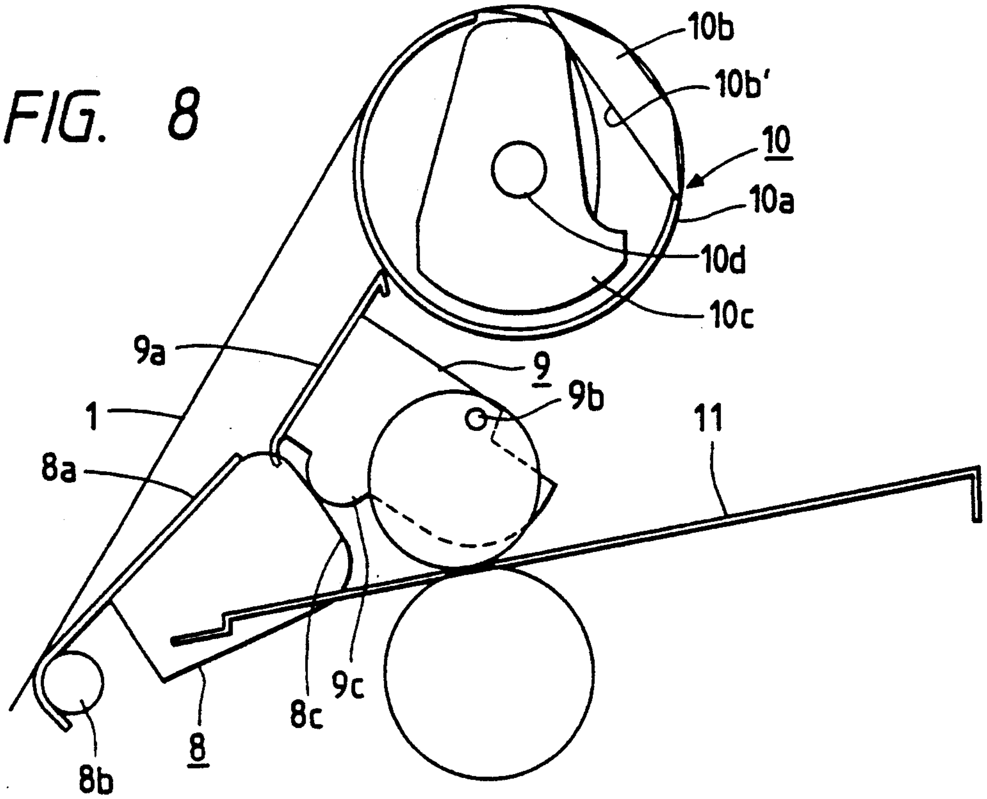
Figure 9:
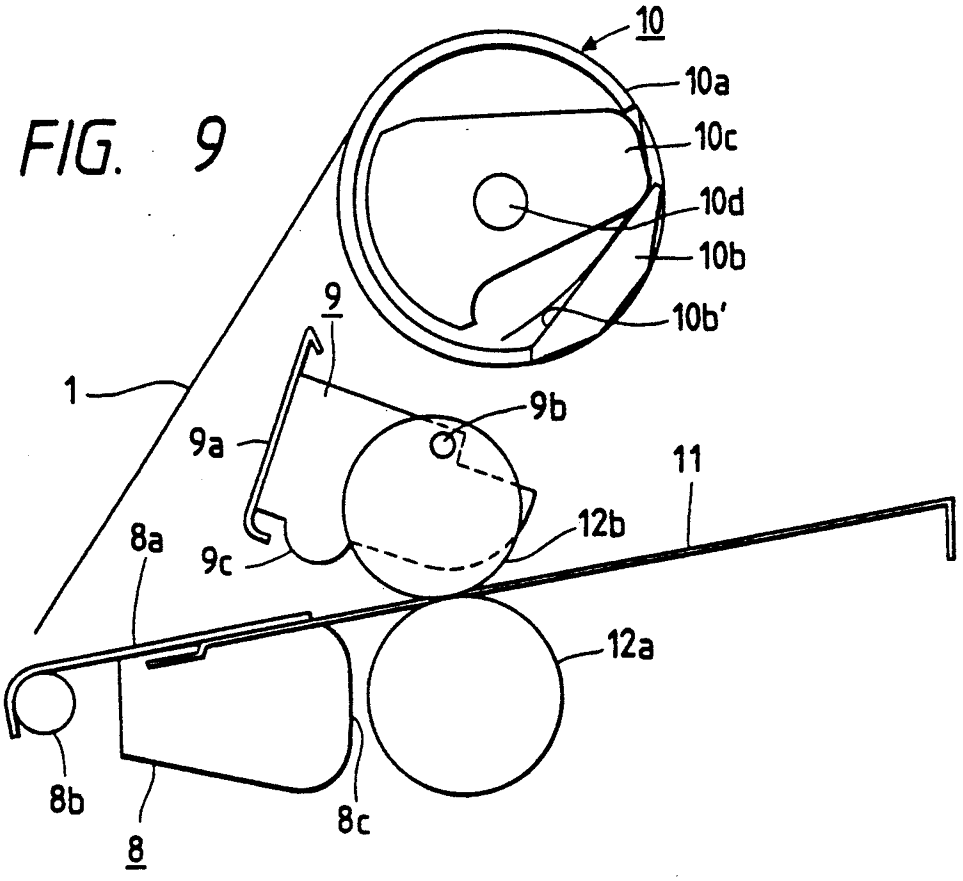

Subsequently, the take-up roller 10 is rotated clockwise by the first rotating drive unit M1 (FIG. 3), as shown in FIGS. 8 and FIG. 9. In the condition shown in FIG. 8, the take-up roller 10 is turned clockwise through an angle of 180 degrees from the position shown in FIG. 6. The take-up roller 10 shown in FIG. 8 has completed a single turn from the position of FIG. 6 so that the dielectric recording paper 1 is wound around the take-up roller 1 by one turn. With this single complete turn, the dielectric recording paper 1 is firmly locked in position against displacement or slip relative to the take-up roller 10 even when the cams 10 release the leading end of the dielectric recording paper 1.

Thereafter, the first guide member 8 is turned clockwise about the pivot axis 8*b* from a first position aligned with the take-up roller 10 to a second position aligned with the cutter 13, as shown in FIG. 9. In response to this angular movement of the first guide member 8, the second guide member 9 turns counterclockwise about the pivot axis 9*b* until the first engagement surface 8*c* of the first guide member 8 disengages the second engagement surface 9*c* of the second guide member 9. The second guide member 9 is thus shifted from a first position in which the downstream end of the second guide surface 9*a* is disposed close to the periphery of the take-up roller 10, to a second position in which the downstream end of the second guide surface 9*a* is spaced far distant from the periphery of the take-up roller 10. When the second guide member 9 is disposed in the second position, there is provided a large space between the take-up roller 10 and the second guide member 9, which space ensures that a large number of turns of the dielectric recording paper 1 can be wound on the take-up roller 10. Then, the take-up roller 10 is rotated at a normal speed to wind up the dielectric recording paper 1. In this instance, the second rotating drive unit (cam motor) M2 is stopped as a firm grip effected by the cams 10*c* on the leading end of the dielectric e recording paper 1 is no longer needed.

Figure 7:
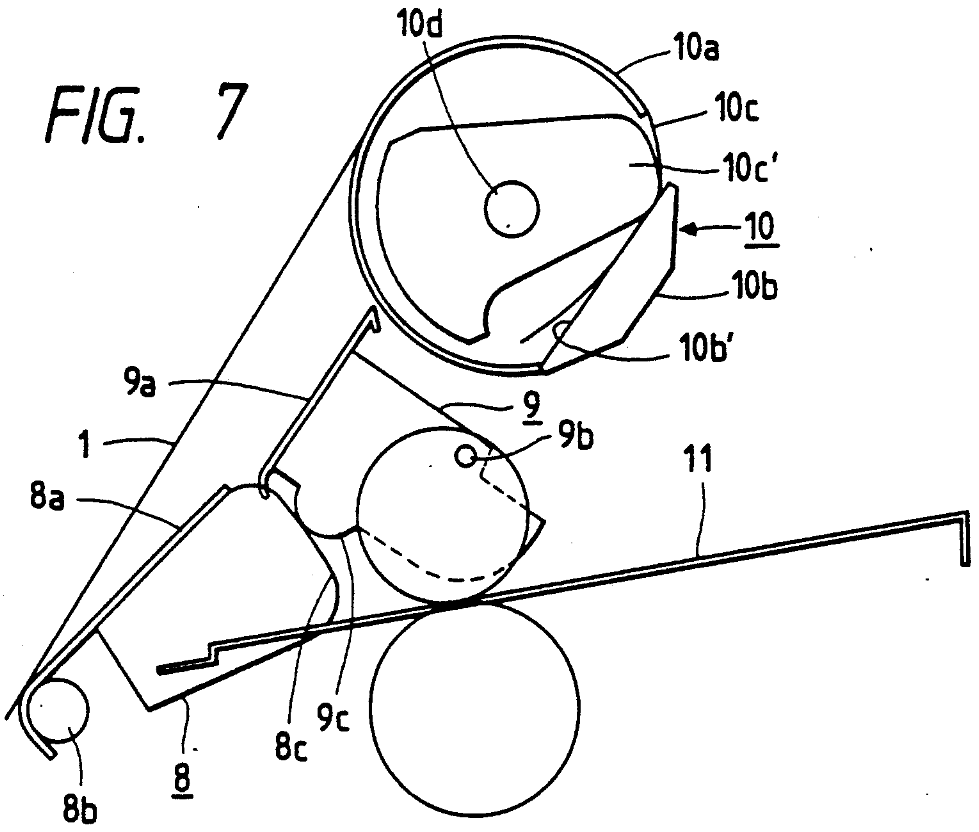
Figure 10:
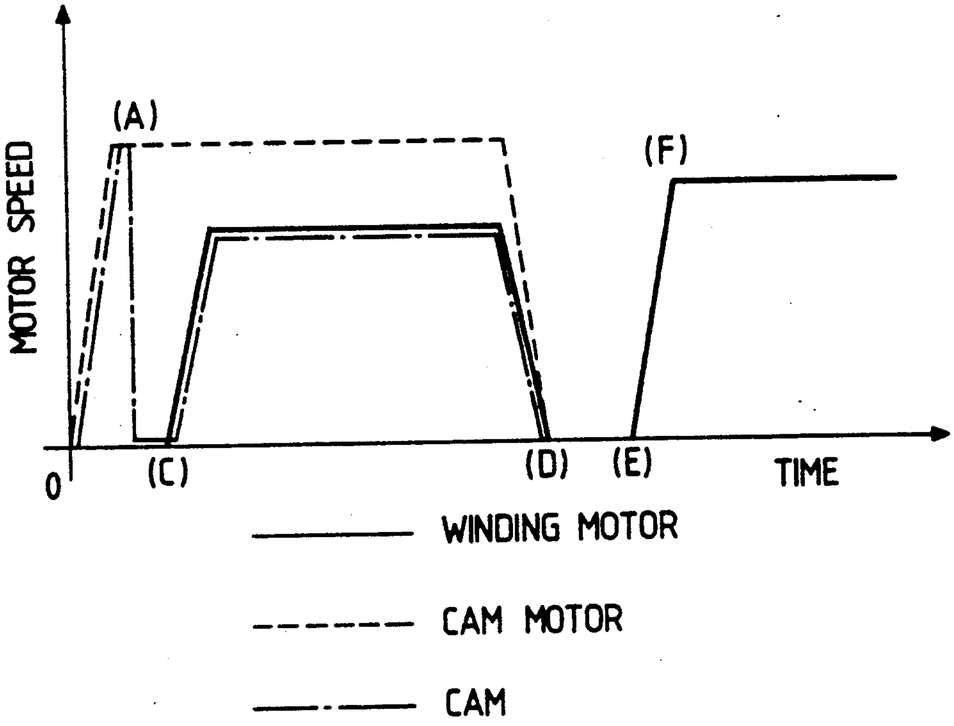
FIG. 10 is a timing chart showing the operation of a winding motor and a cam motor.

FIG. 10 is a time chart illustrating the sequence of operation of the winding motor constituting the first drive unit M1 and the cam motor constituting the second drive unit M2. The operation of the take-up roller 10 begins with parts held in the condition shown in FIG. 4. The cam motor M2 is energized and then gradually speeds up until a predetermined speed is reached (point A), whereupon the cam motor M2 continues rotation at this predetermined speed. With this rotation of the cam motor M2, the cams 10*c* are turned clockwise as shown in FIGS. 5 and 6 until they abut against the inside surface 10*b'* of the take-up roller 10 with the leading end of the dielectric recording paper 1 disposed therebetween (point B). In this instance, since the take-up roller 10 is not rotating, a further angular movement of the cams 10*c* in the clockwise direction is prohibited and a torque exerted from the cam motor M2 on the cams 10*c* exceeds a predetermined value whereupon the slip clutch associated with the cam motor M2 slips and thereby disengages the cams 10*c* from the cam motor M2. The cam motor M2 can, therefore, continue its rotation at the predetermined speed. The continuously rotating cam motor M2 is in the "slipping state" relative to the cams 10*c*. Thereafter, the winding motor M1 is energized (point C) to rotate the take-up roller 10 clockwise as shown in FIGS. 7 and 8 until the dielectric recording paper 1 is wound on the take-up roller 10 by one turn. With this angular movement of the take-up roller 10, a load on the cams 10*c* is lowered whereupon a rotary motion of the cam motor M2 is transmitted via the slip clutch to the cams 10*c*, causing the cams 10*c* to rotate together with the take-up roller 10 about the axis of rotation of the take-up roller 10 while gripping the leading end of the dielectric recording paper 1 because the cam motor M2 is rotating at a higher speed that the winding motor M1. The winding motor M1 and the cam motor M2 are de-energized, thereby stopping rotation of the take-up roller 10 and the cams 10*c* (point D) for purposes of confirmation of the winding condition of the dielectric recording paper 1. Subsequently, the first and second guide members 8, 9 are moved into their respective second positions so as to provide a large space around the take-up roller 10, as shown in FIG. 9. Thereafter, the winding motor M1 is energized again (point E) to rotate the take-up roller 10 at a normal speed (point F) in the clockwise direction to wind up the dielectric recording paper 1 around the take-up roller 10. In this instance, the cam motor M2 is kept in an inoperative condition as the grip on the leading end of the dielectric recording paper 1 is not needed any more.

During the image recording process, due to some reasons, the leading end of the dielectric recording paper 1 may enter the take-up roller 10 in an obliquely displaced posture relative to the feed path, as shown in FIG. 11. According to the invention, the anti-slip member 10*e* (FIG. 2) such as a rubber sheet is attached to a portion of the inside surface 10*b*′ of the take-up roller 10 against which the leading end of the dielectric recording paper 1 is forced by the cams 10*c*. Since the number of cams 10 is greater at the central portion than at the opposite end portions of the take-up roller 10, a friction acting between the anti-slip member 10*e*, the dielectric recording paper 1 and the cams 10*c* becomes greater at the central portion than at the opposite end portions of the take-up roller 10. In addition, the peripheral speed of the take-up roller 10 is greater than the peripheral speed of the recording paper convey rollers 6*a*, 6*b*, so that the dielectric recording paper 1 is tensioned between the take-up roller 10 and the recording paper convey rollers 6*a*, 6*b*. Due to the particular distribution of friction described above, a greater tension is exerted on a central portion of the dielectric recording paper 1, tending to bring the dielectric recording paper 1 into alignment with the feed path as a leading end portion of the dielectric recording paper 1 is wrapped around the take-up roller 10. The dielectric recording paper 1 thus aligned is wound on the take-up roller 10.

FIG. 12 shows another arrangement effective to rectify the direction of movement of a leading end of a dielectric recording paper when the leading end moves obliquely into the take-up roller 10. According to this arrangement, those cams 10*c* (only one shown and indicated by the solid lines) which are disposed at a central portion of the take-up roller 10 are mounted on the cam shaft 10*d* at a different setting angle to the setting angle of two cams 10*c* (only one shown and indicated by broken lines) disposed adjacent to the opposite ends of the take-up roller 10. More specifically, the solid-lined central cams 10*c* are in advance of the broken-lined end cams 10*c* in phase in a direction same as the direction of rotation of the take-up roller 10 effected when the take-up roller 10 is winding up the dielectric recording paper 1. With this phase difference, if the leading end of the dielectric recording paper 1 advancing into the take-up roller 10 is displaced obliquely, as shown in FIG. 11, four central cams 10*c* are brought into frictional contact with the dielectric recording paper prior to the engagement between two end cams 10*c* and the dielectric recording paper 1. When a central portion of the leading end of the dielectric recording paper 1 is caught by the central cams 10*c*, the dielectric recording paper 1 is tensioned between the take-up roller 10 and the recording paper convey rollers 6*a*, 6*b*, whereby the obliquely displaced posture of the leading end of the dielectric recording paper 1 is automatically rectified or corrected.

FIG. 13 illustrates another form of the arrangement which is effective to correct the direction of movement of a leading end of a dielectric recording paper 1 when the leading end moves obliquely into the take-up roller 10. According to this arrangement, an outside surface of a central portion of the hollow cylindrical body 10′ has a coefficient of friction which is larger than the coefficient of friction of an outside surface of opposite end portions 10*b*″ of the hollow cylindrical body 10′. More concretely, an outside surface of a central portion 10*a*′ of the first peripheral wall portion 10*a* of the hollow cylindrical body 10′ is coated with a film of an anti-slip material having a large coefficient of friction, as indicated by cross-hatching. Examples of such anti-slip material include a synthetic resin, a paint or the like having anti-slip properties. The central portion 10*a*′ of the first peripheral wall portion 10*a* preferably has a length ranging from one third to two thirds of the entire length of the hollow cylindrical body 10′. In the illustrated embodiment, the outside surface of the second peripheral wall portion 10*b* has a same coefficient of friction over the entire area. However, it may be possible to provide such an anti-slip coating film on a central portion of the outside surface of the second peripheral wall portion 10*b* as in the same manner as done with the central portion 10*a*′ of the first peripheral wall portion 10*a*. During the image recording process, it may occurs that a leading end of the dielectric recording paper 1 moves obliquely into the take-up roller 10 (see FIG. 13) and such an obliquely displaced posture of the leading end is temporarily secured by being gripped by the cams 10*c*. The dielectric recording paper 1 is then wound around the take-up roller 10 under tension. In this instance, however, since the outside surface of the central portion of the hollow cylindrical body 10′ has a larger coefficient of friction than the opposite end portions 10*b*″, a tension is exerted mainly on a central portion of the dielectric recording paper 1 being wound. As a result of this concentration of tension, a force is produced, tending to automatically align the dielectric recording paper 1 as the winding proceeds. The obliquely displaced entering posture of the dielectric recording paper is thus rectified.

Figure 14:
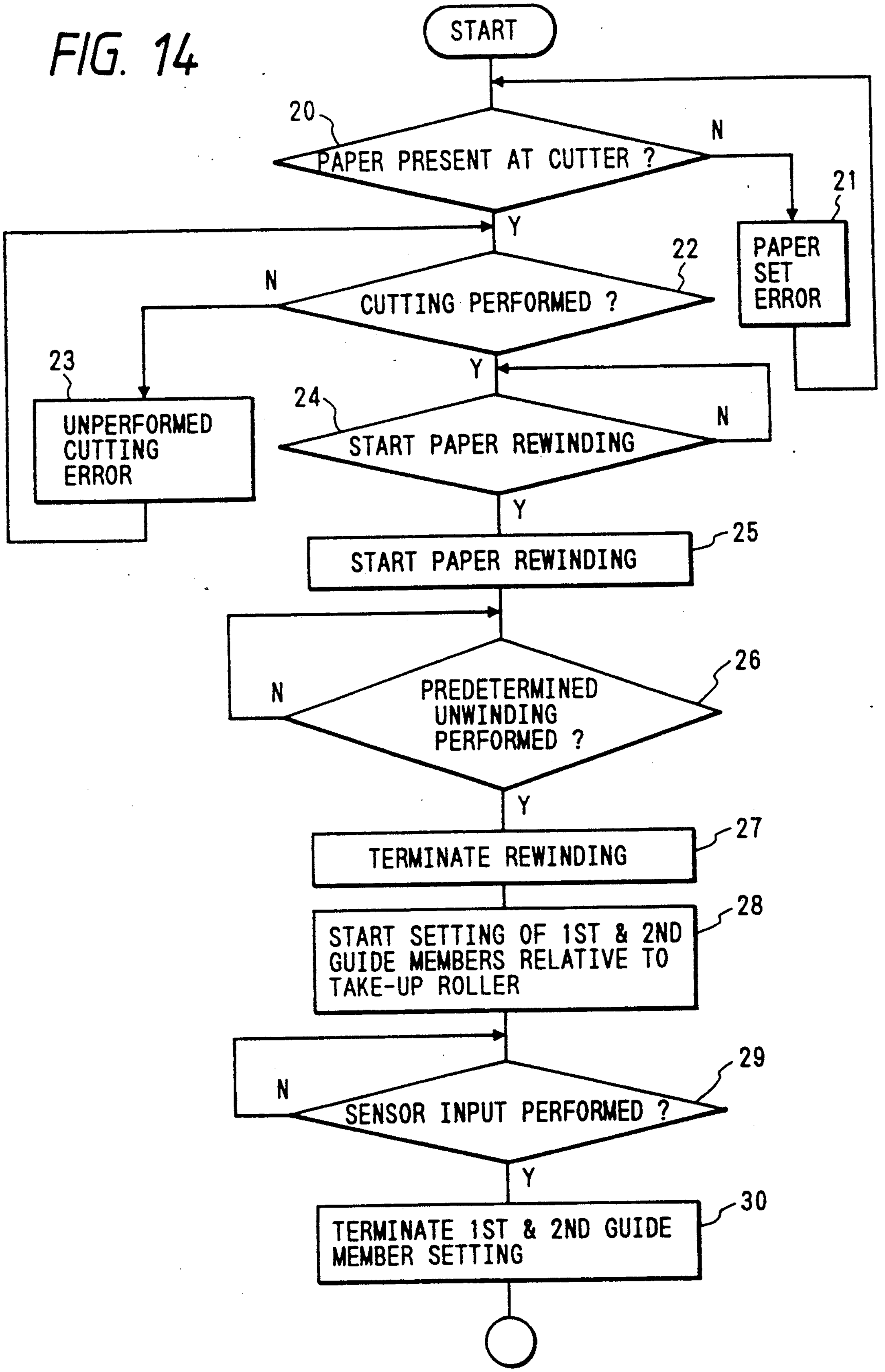
FIGS. 14 and 15 are flowcharts illustrating the sequence of operation of the multi-color image recording apparatus.
Figure 15:
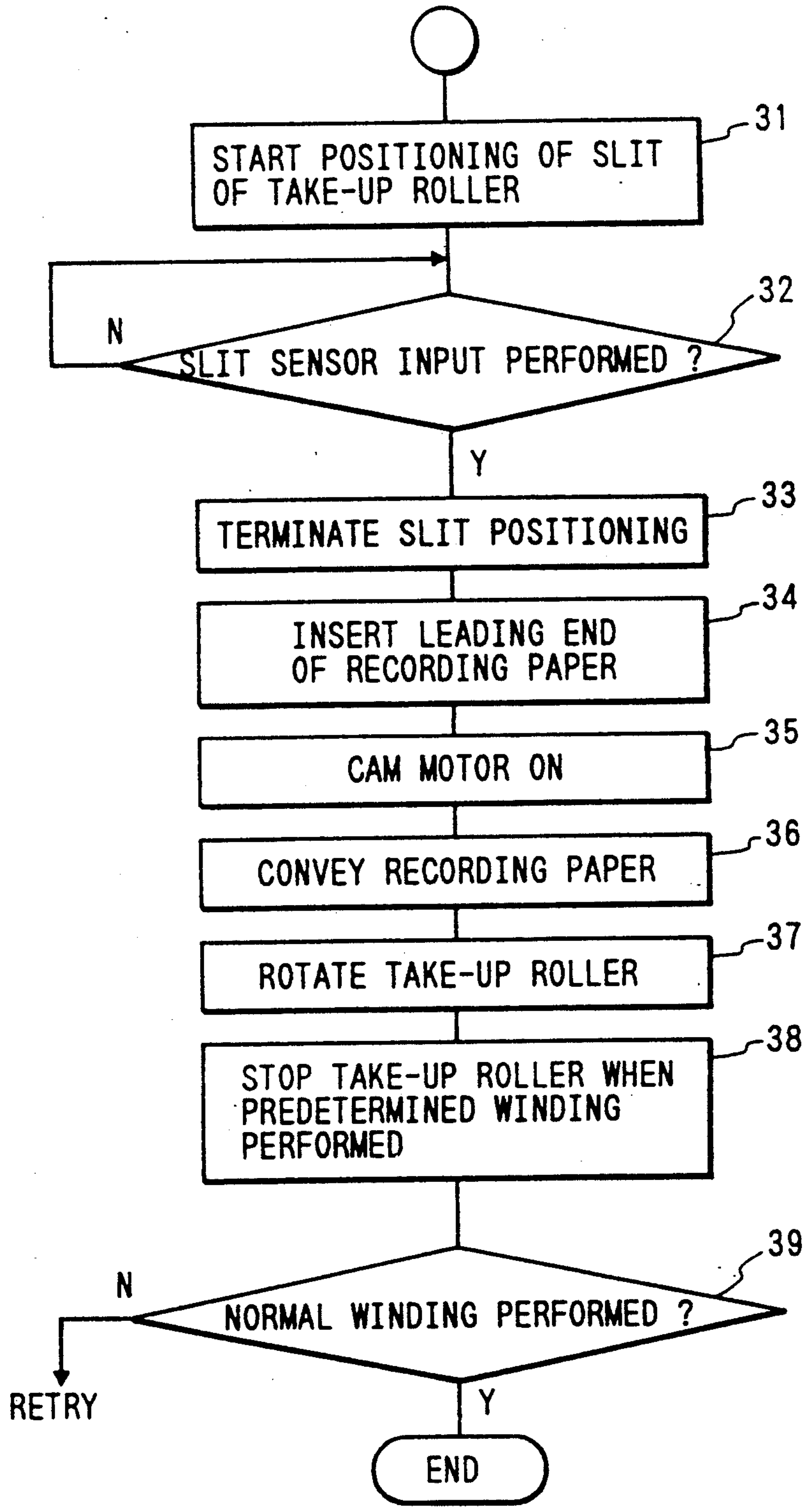

The sequence of operation of the multi-color recording apparatus of this invention will be described with reference to flowcharts illustrated in FIGS. 13 and 14. For purposes of illustration, the operation begins from a condition in which a portion of the dielectric recording paper bearing a first multi-color, superposed image is cut by the cutter 13 and terminates in a condition in which the take-up roller 10 is ready to commence its winding operation.

After the operation starts, a step 20 judges whether the dielectric recording paper 1 is present at the cutter 13. If no, a step 21 indicates a recording paper setting error until the dielectric recording paper 1 properly set to the cutter 13. Conversely if yes, a further judgment is performed at step 22 so as to determine whether cutting is performed or not. If no, then a step 23 indicates an unperformed cut error and operation returns to the step 22. If yes, the operation advances to a step 24 for starting the image recording process. Subsequently, a step 25 starts rewinding the dielectric recording paper 1 onto the supply roller 2 until a leading end of the dielectric recording paper 1 arrives at the guide plate 7. During that time, a step 24 judges whether a predetermined amount of rewind is reached or not. If no, this means that the leading end of the dielectric recording paper 1 is ahead of the guide plate 7 and hence the rewinding operation at the step 22 is continued. If yes, this means that the leading end of the dielectric recording paper 1 arrives at the guide plate 7 and then the rewinding operation is terminated at a step 27. Subsequently, a step 28 switches the first and second guide plates 8, 9 from the second position aligned with the cutter 13, as shown in FIG. 9, to the first position direction aligned with the take-up roller 10, as shown in FIGS. 1 and 2, in preparation for a subsequent transfer of the dielectric recording paper 1 to the take-up roller 1. The guide member shifting operation is monitored by a sensor (step 29) which is designed to send an electric signal to a step 30 when the first guide member 8 assumes its first position shown in FIGS. 1 and 2. Upon receipt of the electric signal from the sensor, the step 30 terminates the guide member shifting operation.

Figure 2:
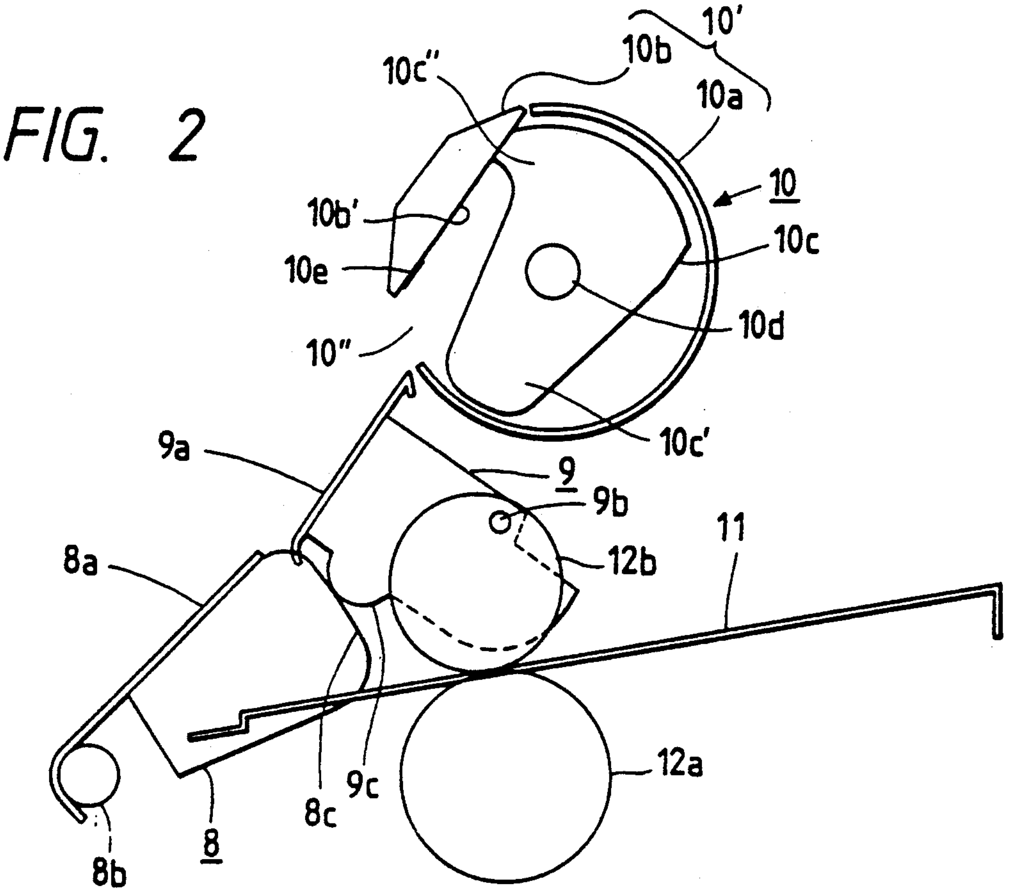
FIG. 2 is an enlarged side view of a switching guide unit and a take-up roller of the multi-color image recording apparatus.

Thereafter, a step 31 turns the take-up roller 10 until the take-up roller 10 assumes its original position shown in FIGS. 1 and 2, in which a lower edge of the slit 10" in the take-up roller 10 is disposed adjacent to a downstream end of the second guide member 9. The angular position of the take-up roller 10 is monitored by a step 32 in which a sensor, upon detection of the original position of the take-up roller 10, sends an electric signal to a step 33. Upon receipt of the electric signal, the step terminates the take-up roller positioning operation. Subsequently, a step 34 inserts the leading end of the dielectric recording paper 1 through the slit 10" into the take-up roller 10 by rotating the recording paper convey rollers 6a, 6b. Then, a step 35 operates the cam motor M2 to turn the cams 10c to force the leading end of the dielectric recording paper 1 against the inside surface 10b' of the take-up roller 10, thereby retaining the leading end on the take-up roller 10. Thereafter, a step 37 operates the winding motor M1 to rotate the take-up roller 10 until the dielectric recording paper 1 is wound around the take-up roller 10 by one turn. Subsequently, a step 39 judges whether the dielectric recording paper 1 is firmly wound on the take-up roller 10 or not. If no, the recording paper setting or fixing operation is performed again. Conversely if yes, the operation comes to an end, and an image forming operation by the electrostatic recording head 3 is started.

Obviously, various minor changes and modifications of the present invention are possible in the light of the above teaching. It is therefore to be understood that within the scope of the appended claims the invention may be practiced otherwise than as specifically described.

What is claimed is:

1. A multi-color image recording apparatus for forming images in a plurality of colors in a superposed manner on a recording medium, which comprises:

recording medium conveying means for reciprocating a plurality of times the recording medium along a feed path;

latent image forming means disposed on said feed path for forming on the recording medium latent images corresponding to the images in the plurality of colors;

a plurality of developing means each supplied with a developer for a different color for changing each respective latent image into a visible image;

cutting means for cutting off a predetermined length from the recording medium;

a take-up roller rotatable in forward and reverse directions for winding up and rewinding the recording medium; and guide means for guiding the recording medium selectively toward said cutting means and said take-up roller, wherein said take-up roller includes means for automatically holding a leading end of the recording medium when the recording medium is guided by said guide means into said take-up roller and for retaining the leading end of the recording medium while the recording medium is wound around said take-up roller.

2. A multi-color image recording apparatus according to claim 1, wherein said holding and retaining means comprises at least one cam movably disposed within said take-up roller and capable of oscillating between a first position in which a portion of said cam forces the leading end of the recording medium against an inside surface of said take-up roller, and a second position in which said portion of said cam is separated from said inside surface of said take-up roller, said cam being rotatable about an axis of rotation of said take-up roller together with said take-up roller while said cam is being disposed in said first position.

3. A multi-color image recording apparatus for forming images in a plurality of colors in a superposed manner on a recording medium, which comprises:

recording medium conveying means for reciprocating a plurality of times the recording medium along a feed path;

latent image forming means disposed on said feed path for forming on the recording medium latent images corresponding to the images in the plurality of colors;

a plurality of developing means each supplied with a developer for a different color for changing each respective latent image into a visible image;

cutting means for cutting off a predetermined length from the recording medium;

a take-up roller rotatable in forward and reverse directions for winding up and rewinding the recording medium; and guide means for guiding the recording medium selectively toward said cutting means and said take-up roller, wherein said take-up roller has a longitudinal slit for receiving a leading end of the recording medium and includes means for holding the leading end of the recording medium within said take-up roller and substantially at the same time for closing said longitudinal slit.

4. A multi-color image recording apparatus according to claim 3, wherein said holding and closing means comprises at least one cam movably disposed within said take-up roller and capable of oscillating between a first position in which a portion of said cam forces the leading end of the recording medium against an inside surface of said take-up roller and substantially closed said slit, and a second position in which said portion of said cam is separated from said inside surface of said take-up roller, said cam including a first arm constituting said portion of said cam, and a second arm integral with said first arm and disposed at such a position relative to said first arm that, when said cam is disposed in said second position, said second arm engages said inside surface of said take-up roller to keep said first arm out of registry with said slit of said take-up roller.

5. A multi-color image recording apparatus according to claim 3, wherein prior to the formation of each of the latent images by said latent image forming means, said slit of the take-up roller is positioned relative to said guide means such that said slit is in registry with the leading end of the recording medium being guided by said guide means.

6. A multi-color image recording apparatus for forming images in a plurality of colors in a superposed manner on a recording medium, which comprises:

recording medium conveying means for reciprocating a plurality of times the recording medium along a feed path;

latent image forming means disposed on said feed path for forming on the recording medium latent images corresponding to the images in the plurality of colors;

a plurality of developing means each supplied with a developer for a different color for changing each respective latent image into a visible image;

cutting means for cutting off a predetermined length from the recording medium;

a take-up roller having a longitudinal slit for receiving a leading end of the recording medium and rotatable in forward and reverse directions for winding up and rewinding the recording medium;

cam means movably disposed for oscillation within said take-up roller for forcing the leading end of the recording medium against an inside wall of said take-up roller to retain the leading end of the recording medium on said take-up roller: and guide means for guiding the leading end of the recording medium selectively toward said cutting means and said take-up roller.

7. A multi-color image recording apparatus according to claim 6, wherein said cam means comprises at least one first cam disposed substantially at a central portion of said take-up roller, and a pair of second cams disposed adjacent to opposite ends of said take-up roller, respectively.

8. A multi-color image recording apparatus according to claim 6, wherein said cam means comprises at least one first cam disposed substantially at a central portion of said take-up roller, and a pair of second cams disposed adjacent to opposite ends of said take-up roller, respectively, said first cam being frictionally engageable with said inside surface of said take-up roller and producing therebetween a first frictional force, said second cams being frictionally engageable with said inside surface of said take-up roller and producing therebetween a second frictional force, said first frictional force being greater than said second frictional force.

9. A multi-color image recording apparatus according to claim 6, wherein said cam means comprises at least one first cam disposed substantially at a central portion of said take-up roller, and a pair of second cams disposed adjacent to opposite ends of said take-up roller, respectively, and frictionally engageable with said inside surface of said take-up roller, said first cam being frictionally engageable with said inside wall of said take-up roller before said second cams engage said inside surface of said take-up roller.

10. A multi-color image recording apparatus according to claim 9, further including a cam shaft rotatably disposed within said take-up roller, said first cam and said second cams being firmly mounted on said cam shaft at different setting angles.

11. A multi-color image recording apparatus for forming images in a plurality of colors in a superposed manner on a recording medium, which comprises:

recording medium conveying means for reciprocating a plurality of times the recording medium along a feed path;

latent image forming means disposed on said feed path for forming on the recording medium latent images corresponding to the images in the plurality of colors;

a plurality of developing means each supplied with a developer for a different color for changing each respective latent image into a visible image;

cutting means for cutting off a predetermined length from the recording medium;

a take-up roller rotatable in forward and reverse directions for winding up and rewinding the recording medium; and guide means for guiding the recording medium selectively toward said cutting means and said take-up roller, wherein said take-up roller has an outer peripheral surface composed of a first portion extending around a central portion of said take-up roller and second portion extending around opposite end portions of said take-up roller, said first outer peripheral surface portion having a coefficient of friction greater then the coefficient of friction of said second outer peripheral surface portion.

12. A multi-color image recording apparatus according to claim 11, wherein said first outer peripheral surface portion has a length ranging from one third to two thirds of the entire length of said take-up roller.

13. A multi-color image recording apparatus for forming images in a plurality of colors in a superposed manner on a recording medium, which comprises:

recording medium conveying means for reciprocating a plurality of times the recording medium along a feed path;

latent image forming means disposed on said feed path for forming on the recording medium latent images corresponding to the images in the plurality of colors;

a plurality of developing means each supplied with a developer for a different color for changing each respective latent image into a visible image;

cutting means for cutting off a predetermined length from the recording medium;

a take-up roller rotatable in forward and reverse directions for winding up and rewinding the recording medium; and guide means for guiding the recording medium selectively toward said cutting means and said take-up roller, said guide means being movable from a first position to a second position to shift the direction of guidance of the recording medium when a predetermined amount of recording medium is wound on said take-up roller.

14. A multi-color image recording apparatus according to claim 13, wherein said guide means is located close to an outer peripheral surface of said take-up roller when it is disposed in said first position, and is spaced far distant from said outer peripheral surface of said take-up roller when it is disposed in said second position.

15. A multi-color image recording apparatus according to claim 13, wherein said guide means comprises first and second pivotally movable guide members, said first guide member having a first guide surface on which the recording medium is guided, a first pivot axis at an end of said first guide surface, and a first engagement surface at an opposite end of said first guide surface, said second guide member having a second guide surface on which the recording medium is guided, a second pivot axis disposed below said second guide surface, and a second engagement surface frictionally engageable with said first engagement surface within a predetermined angular range for causing said second guide member to turn about said second pivot axis in response to pivotal movement of said first guide member.

* * * * *